(12) United States Patent
Hüttlin (10) Patent No.: US 6,367,165 B1
(45) Date of Patent: Apr. 9, 2002

(54) DEVICE FOR TREATING PARTICULATE PRODUCT

(76) Inventor: Herbert Hüttlin, Wiesentalstrasse 74 A, D-79539 Lörrach (DE)

( * ) Notice: Subject to any disclaimer, the term of this patent is extended or adjusted under 35 U.S.C. 154(b) by 0 days.

(21) Appl. No.: 09/495,790

(22) Filed: Feb. 1, 2000

(30) Foreign Application Priority Data

Feb. 3, 1999 (DE) .......................................... 199 04 147

(51) Int. Cl.[7] .............................................. F26B 17/00
(52) U.S. Cl. .......................... 34/582; 34/588; 34/168; 34/169; 34/237; 432/58
(58) Field of Search .......................... 34/582, 588, 576, 34/168, 169, 195, 196, 84, 224, 225, 231, 233, 237, 238, 360, 487, 488, 514; 432/15, 58

(56) References Cited

U.S. PATENT DOCUMENTS

| 4,000,563 A | 1/1977 | Cubitt et al. | |
|---|---|---|---|
| 4,115,929 A | 9/1978 | Staub et al. | 34/10 |
| 4,360,976 A | * 11/1982 | Meckel et al. | 34/233 |
| 4,397,102 A | * 8/1983 | Gamble et al. | 432/58 |
| 4,475,467 A | * 10/1984 | Korenberg | 432/58 |
| 4,970,804 A | 11/1990 | Huttlin | |
| 5,101,742 A | * 4/1992 | Sowards et al. | 432/58 |
| 5,145,650 A | 9/1992 | Huttlin | |
| 5,695,701 A | 12/1997 | Funder et al. | |

FOREIGN PATENT DOCUMENTS

| DE | 3107 357 A1 | 9/1982 |
|---|---|---|
| DE | 203 826 | 11/1983 |
| DE | 3839723 C1 | 7/1989 |
| DE | 0 370 167 B1 | 10/1991 |
| DE | 0 436 787 B1 | 12/1992 |
| DE | 4217 110 A1 | 11/1993 |

* cited by examiner

*Primary Examiner*—Jiping Lu
(74) *Attorney, Agent, or Firm*—St. Onge Steward Johnston & Reens LLC (57) ABSTRACT

A device for treating particulate product has a process chamber for receiving and treating the product. A bottom of the process chamber is constructed from substantially plane baffle plates overlapping each other with slots formed between said overlapping plates. Process air can be introduced into the process chamber via said slots between said plates with a substantially horizontal component of motion. Said baffle plates and the resulting slots are arranged in such a way that two opposite flows of incoming process air are produced. Said two opposite flows are directed along a substantially horizontal path and meet along a breaking-up zone and are then deflected to form an upwardly directed, substantially vertical flow.

14 Claims, 5 Drawing Sheets

DEVICE FOR TREATING PARTICULATE PRODUCT

BACKGROUND OF THE INVENTION

The invention relates to a device for treating particulate product having a process chamber for receiving and treating the product, a bottom of the process chamber being constructed from baffle plates, that overlap each other, with slots formed between the latter through which the process air can be introduced into the process chamber with a substantially horizontal component of motion.

A device of this kind is known from EP 0 370 167 A1.

Devices of this kind are used to dry, granulate or coat particulate products.

A gaseous agent, known as process air, is introduced into the process chamber through the bottom, entering the process chamber through the numerous slots between the overlapping baffle plates in substantially horizontal direction.

In the case of the before-mentioned device the bottom consists of a ring of radially extending guide plates, that overlap each other, with the slots extending in radial direction. The product to be treated, placed on the bottom, is whirled up by the process air to form a toroidally rotating band. The bottom is annular in shape, i.e. comprises a centrally arranged displacement body. Due to its initial horizontally directed component of motion, the toroidally rotating band moves on a process air cushion. For spraying a desired agent on to the particulate product to be treated, nozzles may be arranged in the bottom between the baffle plates.

This technology is based on the principle that the process air must be introduced into the process chamber initially with a substantially horizontal component.

In a further device for treating particulate product, known from EP 0 436 787 A1, the process air is guided in such a way that it is imparted a substantially bottom-up, i.e. a substantially vertical flow direction already as it enters the process chamber. In the process chamber, there are provided longitudinally extending hollow lances which generally extend in cross-wise direction to the gas flow and which are provided with upwardly directed nozzles so that both the process air and the spraying direction of the nozzles follow a substantially vertical line of movement from the bottom toward the top. A device of that kind serves in particular for coating relatively coarse-grained products, for example pellets, in the pharmaceutical area.

The spectrum of particulate products to be treated is much broader in the case of the before-mentioned device according to EP 0 370 167 A1 than the spectrum of products that can be treated wit h the last-mentioned device.

Especially in applications in the fields of chemistry and pharmaceutical technology, the following essential criteria must be considered in connection with devices of that kind.

In order to meet the demands placed on hygiene, agreeable to contact and easy to clean surfaces should be provided.

The processes in the process chamber should be reproducible, which means that any functional contingencies must be excluded by suitable means.

A very e essential criterion is to be seen in what is known as "scaling-up", i.e. the ability to enlarge the scale linearly while maintaining the specific process functions, such as the continuous recirculation and movement of the product according to an exactly defined pattern. Reverting to the rotating toroidal band produced in the device described first, this means that any scaling-up should only have the result to produce a rotating band of larger diameter, while the flow, particle and motion conditions prevailing in the band as such per volume unit should remain unchanged.

Further criteria are the best possible function of the device, achieved by giving the components a formal design adapted to the particularities of the product to be treated, in combination with the aerodynamic and thermodynamic aspects to be taken into consideration. In addition, an optimum design is to be achieved by suitable configuration both of the entire unit and of its details, in order to ensure agreeable handling, where form is function and function is form.

In the case of the device mentioned first, the product placed on the bottom can be lifted off the latter by the process air entering the system in horizontal direction and can be expanded to sort of an air bed.

However, the process air must of course eventually exit the rotating toroidal band, which ideally should occur without any outbursts or sort of volcanic eruptions of gas from the toroidal band. But finally there do not exist any defined breaking-up points for the moving product and/or any defined points of exit for the process air from the product. In order to achieve the best possible degree of uniformity in the drying process of the particulate product, especially in cases where a liquid sprayed from nozzles is to be applied as uniformly as possible on the product, that has been whirled up in the toroidal band, the nozzles must be distributed, statistically, in such a way that all breaking-up points, that may arise in statistical distribution, will be uniformly covered in statistical average.

A further considerable problem with respect to the design of the radial slots arises in connection with the scaling-up aspect. Viewed from the top, the different overlapping baffle plates are substantially trapezoidal in shape. Now, when the diameter of the bottom is very much enlarged for scaling-up purposes, the distance at the periphery between two slots following each other in the direction of flow is much smaller in the radially inner region than in the radially outer region. To say it in other words: A particle of the product circulating in the radially inner region is accelerated and whirled up by the process air, that enters through the next following slot, after a much shorter travel than a particle circulating in a radially outer region. In order to ensure improved uniformity of the conditions it is, therefore, necessary to impart to a particle, that revolves in a radially outer region, a higher circumferential speed in order to guarantee that it will be surrounded, accelerated and whirled up by new process air at the same point in time as a radially inner particle. This is effected by making the height of the air exit slots greater toward the outside so that more process air can enter through the slots in the radial outer region. But this necessarily has the effect that the baffle plates rise a little in radial direction toward the outside and that the outer edge, consequently, presents a mechanical obstacle to the revolving floating band. It is, however, desired to have the product band float on an air cushion in non-contact fashion. In order to form a closed ring, the individual baffle plates are obliquely inclined. This inclination, and the arrangement of the baffle plates in the form of a ring where each baffle plate overlaps the next following baffle plate, lead to a structure that exhibits relatively large openings in the area of the slots through which product may drop, which is undesirable.

In view of the criteria mentioned before and the disadvantages of the device described first, as regards the undefined breaking-up points and the difficulties in connection with the scaling-up aspect, it is the object of the present invention to overcome these advantages and to provide a device that allows a broad spectrum of particulate product to be optimally treated.

SUMMARY OF THE INVENTION

This object is achieved according to the invention by the fact that the slots are arranged in such a way that two opposite flows of incoming process air, being directed one toward the other and along a substantially horizontal path, meet along a breaking-up zone and are then deflected to form an upwardly directed, substantially vertical flow.

As the process air is introduced through the bottom with a substantially horizontal motion component, it is possible to initially build up an air cushion carrying the product that has been whirled up in the process chamber. By providing two substantially horizontal, opposite flows, directed one toward the other, a zone is created where the two flows meet and are forcedly deflected in vertical upward direction. Escaping toward the bottom is rendered impossible by the baffle plates of the bottom. One thus obtains a well-defined breaking-up zone for the product to be treated in which the process air rises or breaks up, thereby exiting from the particulate product. The process air, that rises in the breaking-up zone to the top in a defined way, entrains part of the product floating on it, which will however leave the process air, which escapes to the top after a relatively short travel, fall back to the bed of product floating above the bottom where it will be once more entrained and, consequently, recirculated by the oppositely directed horizontal flows. In the-area of the bottom, up to the breaking-up point, the product is subjected to well-defined uniform treating conditions that depend on, among other things, the quantity and speed of the process air being introduced and the distance between two successive slots. These conditions change abruptly only in the breaking-up zone where the process air escapes to the top in a defined way due to the substantially rectangular deflection.

Consequently, there is provided a relatively long defined and substantially horizontal path where the different particles can be treated with the process air under properly controllable and manageable conditions.

If, for example, the product is only to be dried, the necessary thermal energy can be transmitted to the product to be treated during that horizontal path to dry the product correspondingly. In the breaking-up zone the process air is then deflected abruptly in upward direction, with the effect that the product will be entrained, the process air will separate from the product after a certain travel and allow the product to drop back to the bottom where it can be subjected to a further drying process over a defined path.

If the product is to be granulated or coated, for example, then a corresponding agent can be supplied to the product in a defined way in the breaking-up zone, and the corresponding drying processes can then take place during the movement along the uniform horizontal and d defined path.

This embodiment now also permits unproblematic "scaling-up" because any linear enlargement of the bottom will not lead to changes in the flow conditions in the horizontal region. It will only be necessary in this case to provide a larger number of baffle plates and slots in successive arrangement. There will still exist a defined breaking-up zone, i.e. the zone in which the oppositely directed flows meet each other. Accordingly, neither the fluidic nor the fundamental structural conditions need to be changed for scaling-up, as was the case, for example, with the device described first, where the baffle plates had to be raised additionally toward the outside for scaling up purposes, so that they presented mechanical obstructions.

The height of the slot and/or the air gaps remains always the same so that there is no risk that large openings may be produced by the scaling-up process through which the product may drop to the bottom. Further, the baffle plates can be arranged horizontally and need not be inclined, which latter arrangement furthers a sliding movement of the resting product in the direction of the air gaps.

According to a further embodiment of the invention at least one nozzle, pointing in vertical upward direction, is arranged in the breaking-up zone.

This feature provides the advantage that the breaking-up zone, in which the substantially horizontal and oppositely directed flows hit upon each other and are deflected toward the top, is used for introducing liquids with which the product is to be treated. The vertically upward flow in the breaking-up zone, which results from the substantially horizontal flows hitting upon each other, exhibits a motion characteristic which is very similar to an atomizing cone expanding in trumpet-like shape, which characteristic is ideal for treating a product with an atomizing cone. Contrary to the device described first, where the nozzles are distributed statistically over the bottom, it is now possible to apply a liquid at a single, well-defined point, namely in the breaking-up zone, which is a considerable advantage under aspects of process and control technology.

According to a further embodiment of the invention, guide surfaces are arranged in the area of the breaking-up zone which define the transition from the horizontal flows to the vertically upward flows.

This feature provides the advantage that in the case of product sensitive to impact the directional change from the substantially horizontal direction to the vertically upward direction is gently assisted by mechanical means. Examples of such delicate products are relatively large pellets, as used in the pharmaceutical industry, that were obtained by granulation or compression and that exhibit relatively sharp edges and corners. Although it is the process air flows, not the product particles, that hit upon each other directly in the breaking-up zone, it cannot be excluded that individual particles may hit each other. If such particles were to hit each other from diametrically opposite directions, eruptions could take place. Such eruptions are not to be expected with relatively small and insensitive products so that in this case no such guide plates would have to be provided, though they may still be present in order to support the directional change.

According to a further embodiment of the invention, slots are arranged also in the area of the circumference of the bottom, through which process air can be introduced in line with the oppositely directed flows.

This feature provides the considerable advantage that no deposits are permitted to form in the circumferential corner region between the horizontal bottom and the upright tank wall. It has been observed that some sorts of products have the tendency to settle gradually in those corners and to thereby escape the further treatment. By arranging slots, through which process air enters the process chamber, also in this critical area, these critical corner points are now sort of continuously blown through.

According to a further embodiment of the invention, the breaking-up zone extends approximately centrally across the bottom.

This feature provides the advantage that the bottom is thereby divided into two mirror-symmetrical identical halves so that when the product eventually reaches the central breaking-up zone it has passed on both sides of that zone similar treating steps which were, in addition, carried out over traveling paths of equal length.

According to a further embodiment of the invention the slots extend along secants, and the breaking-up zone extends along a diameter, in a circular bottom.

In the case of such a design of the bottom or the process chamber the length of the secants increases continuously in radial direction from the outside toward the inside, which means that the space available for, and the process air that can be supplied to a given product quantity increases toward the breaking-up zone. To say it in other words, the product can sort of relax or breathe out, and the particles, having available increasingly more space, can permanently move away one from the other so that they can be optimally treated with the process air without hindering or influencing one another. It is only in the breaking-up zone that the particles meet again and are deflected vertically toward the top.

Other geometries than circular shapes are also possible, as for example square or rectangular shapes. If the breaking-up zone extends diagonally through a square, then the two oppositely directed areas are divided into triangles in which the product moves from the point toward the breaking-up zone.

However, there is also the possibility to give the bottom a rectangular shape and to arrange the slots in parallel to the short sides of the rectangle so that, depending on the length of the long sides of the rectangle, sufficient horizontally directed treating paths are available before the oppositely directed flows meet at the center of the breaking-up zone.

This provides the system-immanent possibility to use a plurality of different bottom geometries with the aim to create optimum conditions for the product to be treated at any time.

According to a further embodiment of the invention, two inflow chambers are arranged beneath the bottom, to which process air can be supplied.

This feature provides the advantage that the two inflow chambers can be used to build up, in a defined fashion, the oppositely directed flow components on both sides of the breaking-up zone or—to say it in other words—to supply the slots arranged on both sides of the breaking-up zone with process air via the two inflow chambers.

According to a further embodiment of the invention the two inflow chambers taper toward the breaking-up zone in vertical direction to a slot that opens directly adjacent the breaking-up zone.

This feature provides the advantage that the inflow chambers do not take up, structurally, the central space immediately below the breaking-up zone so that sufficient space is available in that area below the bottom to arrange other components, for example nozzles. Slots remote from the central breaking-up zone are supplied by the respective inflow chamber according to gas engineering principles. The orifices of the two inflow chambers immediately in front of the breaking-up zone provide the possibility to produce gas flows that meet each other at this point in an exactly defined way in order to form an upwardly directed vertical and central core flow. It is thus possible to produce a protective air cushion in the breaking-up region between the flows meeting each other.

According to further embodiment of the invention, the at least one nozzle is arranged between the divided inflow chambers, structurally separate from them.

This feature provides the advantage that inflow chambers and nozzles are each independent units which can be handled, for example cleaned, independently one from the other. This further opens up the possibility to pull off a nozzle, that might be blocked or clogged, for a short time during current operation and to clean it and mount it again without having to interrupt the process. And this because the two gas flows meeting each other form a continuous and tight gas shield that prevents any contamination from entering the process chamber during the short period of time needed for inspection purposes.

According to a further embodiment of the invention the at least one nozzle can be removed from the bottom from below.

This feature provides the advantage that the beforementioned inspection, for example, can be carried out in a simple way also during operation of the system, by simply pulling such a nozzle off the bottom from below, or pivoting it away from the bottom in downward direction.

According to a further embodiment of the invention perforations are provided in the baffle plates approximately in their second half before the next slot, viewed in the flow direction of each oppositely directed partial flow exiting the slots.

This feature provides the advantage, especially in the case of relatively heavy and coarse particulate product, that the latter is imparted during the second half of its travel between two slots a certain vertical component in order to compensate for any dropping tendency caused by gravity so that even in the case of such critical products the latter will permanently float on an air cushion over a baffle plate between two successive slots.

According to a further embodiment of the invention the spacings between the slots, viewed in the direction of flow, are substantially equal.

This feature provides the advantage that these equal spacings produce very specific, defined treating conditions in the substantially horizontal partial flows which will be maintained also when the system is scaled-up, i.e. when a plurality of such uniformly spaced slots are arranged one behind the other.

It is understood that the features mentioned above and those yet to be explained below can be used not only in the respective combinations indicated, but also in other combinations or in isolation, without leaving the context of the present invention.

BRIEF DESCRIPTION OF THE DRAWINGS

The invention will be described and explained in more detail below with reference to certain selected exemplary embodiments in conjunction with the appended drawings, in which.

DETAILED DESCRIPTION OF PREFERRED EMBODIMENTS

The device shown in FIGS. 1 to 6 is indicated generally by reference numeral 10.

Figure 1:
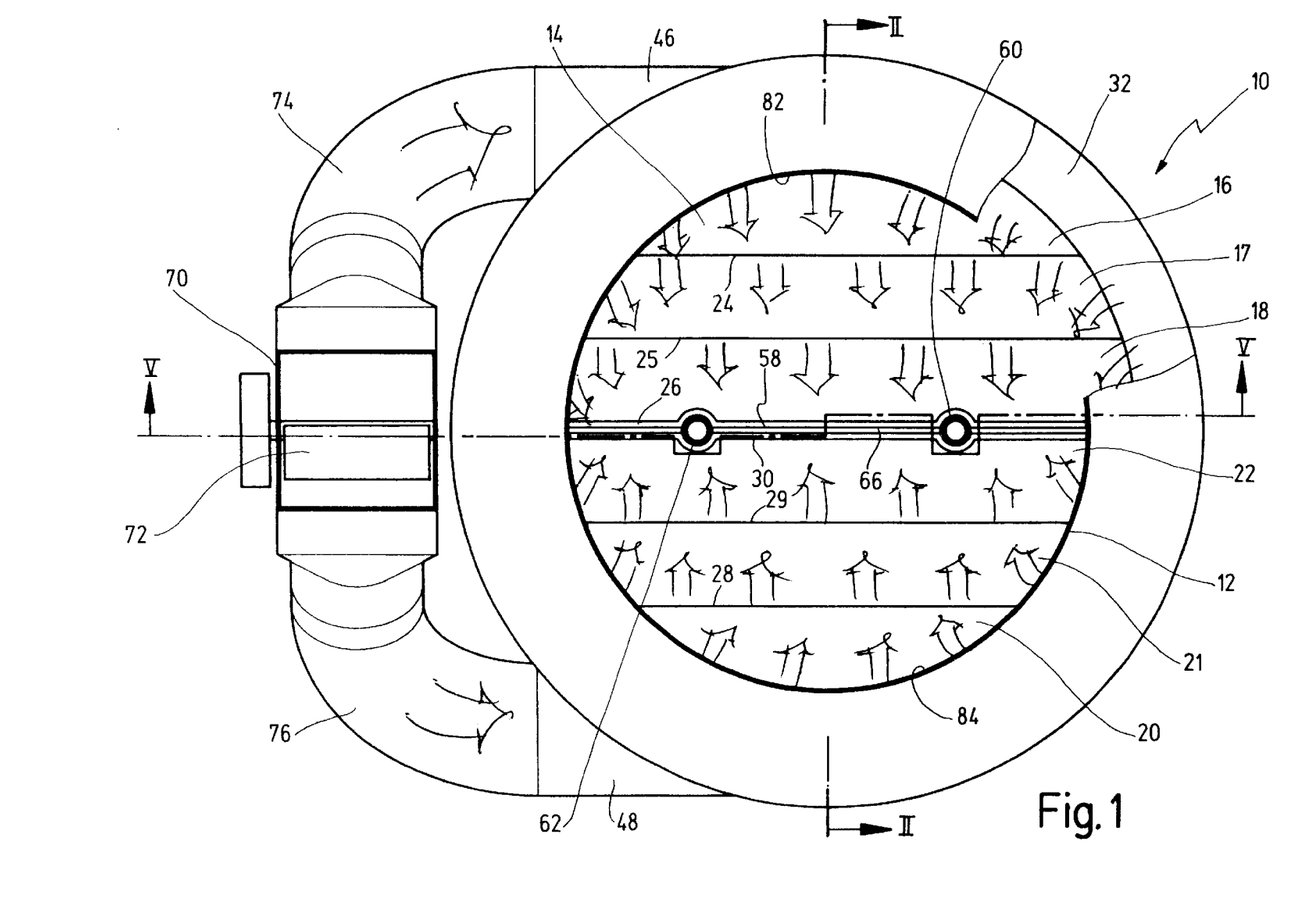
FIG. 1 shows a cross-section of a device, taken above the latter's bottom, with the bottom viewed from above.
Figures 2, 3:
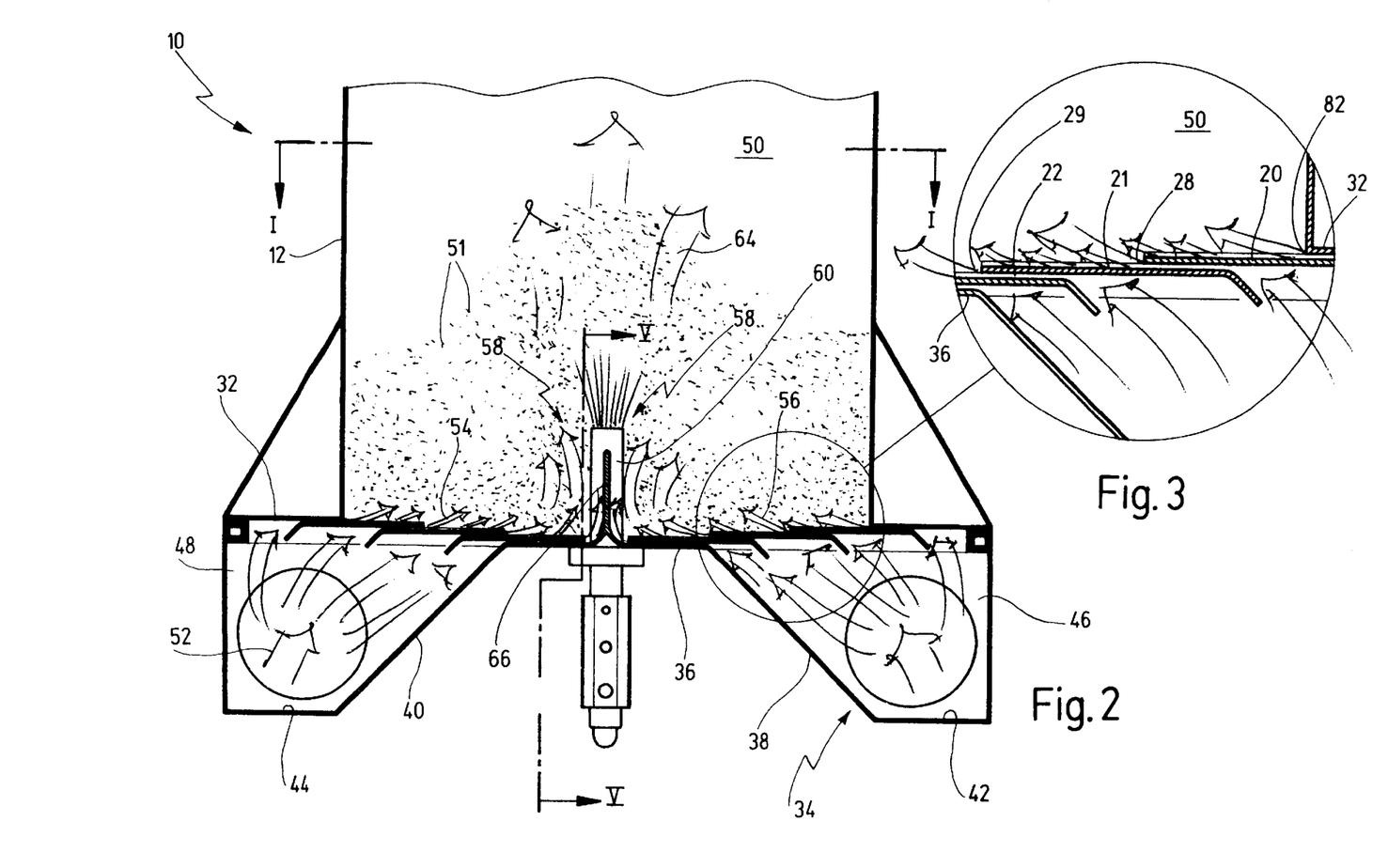
FIG. 2 shows a sectional view taken along line II—II in FIG. 1.
FIG. 3 shows an enlarged representation of the area marked by a circle in FIG. 2.

The device 10 comprises an upright cylindrical tank 12 provided with a bottom 14.

The cover area of the tank 12 is not shown as its design can be selected in the known way, as usual with devices of that kind.

The bottom 14 consists of a first set of baffle plates 16, 17, 18 that overlap one another.

The baffle plate 16 is the uppermost plate and overlaps the next lower baffle plate 17 which in its turn overlaps the slightly lower baffle plate 18.

The geometry of the baffle plates 16, 17 and 18 is such that the assembly exhibits substantially the shape of a half-disk.

A further set of baffle plates 20, 21, 22 is provided in mirror-symmetrical arrangement to the set described before. The baffle plate 20 overlaps the next lower baffle plate 21, the latter in its turn overlaps the next lower baffle plate 22, as can be seen best in the sectional view of FIG. 2 and the enlarged representation of FIG. 3.

As a result of this overlapping arrangement a slot 24 is produced between the baffle plates 16 and 17, and a slot 25 is produced between the baffle plates 17 and 18.

Correspondingly, a slot 28 is provided between the baffle plates 20 and 21, and a slot 29 between the baffle plates 21 and 22.

A lower bottom provided below the baffle plates comprises a full-length central piece 36, located below the plates 18 and 22, so that further slots 26 and 30 are formed between that center piece 36 and the plate 18 on the one hand and the center piece 36 and the plate 22 on the other hand.

The slots 36 and 30 open at the same level and are arranged diametrically opposite one to the other.

All slots 24 to 26 and 28 to 30 are straight in shape, i.e. extend along secants of the circumferential circle of the circular bottom 14, and are parallel one to another. All slots have the same height.

As appears especially from the sectional representation of FIG. 2, the central piece 36 of the lower bottom 34 transitions via inclined portions 38 and 40 to housings 42 and 44, respectively, which are connected in sealing relationship with an outer circumferential edge of an annular flange 32 provided on the lower end of the tank 12.

The housings 42 and 44 define inflow chambers 46 and 48.

The interior of the tank 12 constitutes a process chamber 50 in which a particulate product 51 is to be treated with process air 52. This seems to be a suitable point to explain the basic and functional principle of the device 10.

The particular design of the superimposed baffle plates 16 to 18 and 20 to 22 causes the process air 52 to exit the inflow chambers 46 and 48 and to enter the process chamber 50 in the form of substantially horizontal flows 54 and 56, respectively.

The flows 54 and 56 are directed in opposite senses and toward each other, as appears especially from the top view of FIG. 1.

The two oppositely directed and substantially horizontal flows 54 and 56 meet each other in a so-called breaking-up zone 58. The breaking-up zone 58 is located in the area of a diameter of the bottom 14, approximately midway between the two slots 26 and 30. In the breaking-up zone 58 the oppositely directed flows 54 and 56 meet each other and are deflected to form an upwardly directed vertical flow 64.

Two upright nozzles 60 and 62, spraying in upward direction, are arranged in the area of the breaking-up zone 58.

In order to provide an additional guiding effect at the transition from the substantially horizontal flows 54 and 56, there is provided in the area of the breaking-up zone 58 a vertically upright guide surface 66 that transitions to the central piece 36 via a gently rounded portion. It is especially the process air quantities exiting the slots 26 and 30 that directly impinge upon the curved portion of the guide surface 66 where they are immediately deflected in vertically upward direction.

The product 51 present in the process chamber 50 is thus treated by the process air 52 in the area of the diametrically opposite flows 54 and 56 and transformed to a floating band moving substantially in horizontal direction.

As can be seen especially in the top view of FIG. 1, the sequence of slots 28, 29 and 30 consists of slots that increase continuously in width so that, correspondingly, they permit rising quantities of process air to enter the chamber so that the product can expand in that flow area. The different particles can move away one from the other and can be optimally treated by the process air without the particles impairing each other. The product can sort of breath out before being moved in vertically upward direction in the breaking-up zone. During this vertically upward movement it can then be sprayed with a liquid through the nozzles 60 and 62, as required, for example for granulation or coating. After a certain period of time, the process air 52 separates from the product 51, which then drops back to the bottom 14 as a result of gravity. The process air 52 is removed from the tank 12 in some known way, if necessary through additional filters, and may be recirculated later into the inflow chambers 46 and 48 after suitable treatment.

Figure 4:
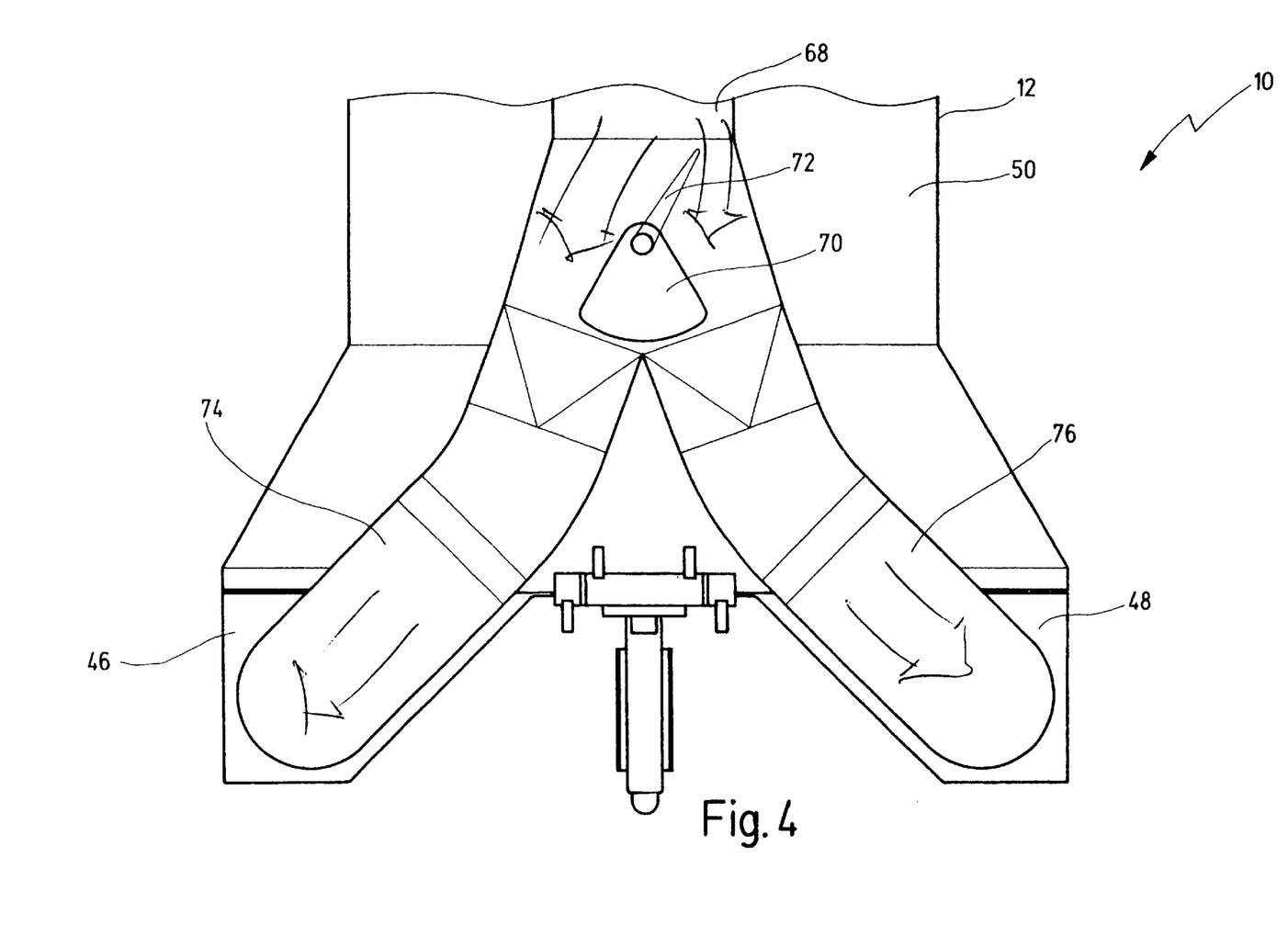
FIG. 4 shows a side view of a detail of the representation of FIG. 1, viewed from the left.
Figures 5, 6:
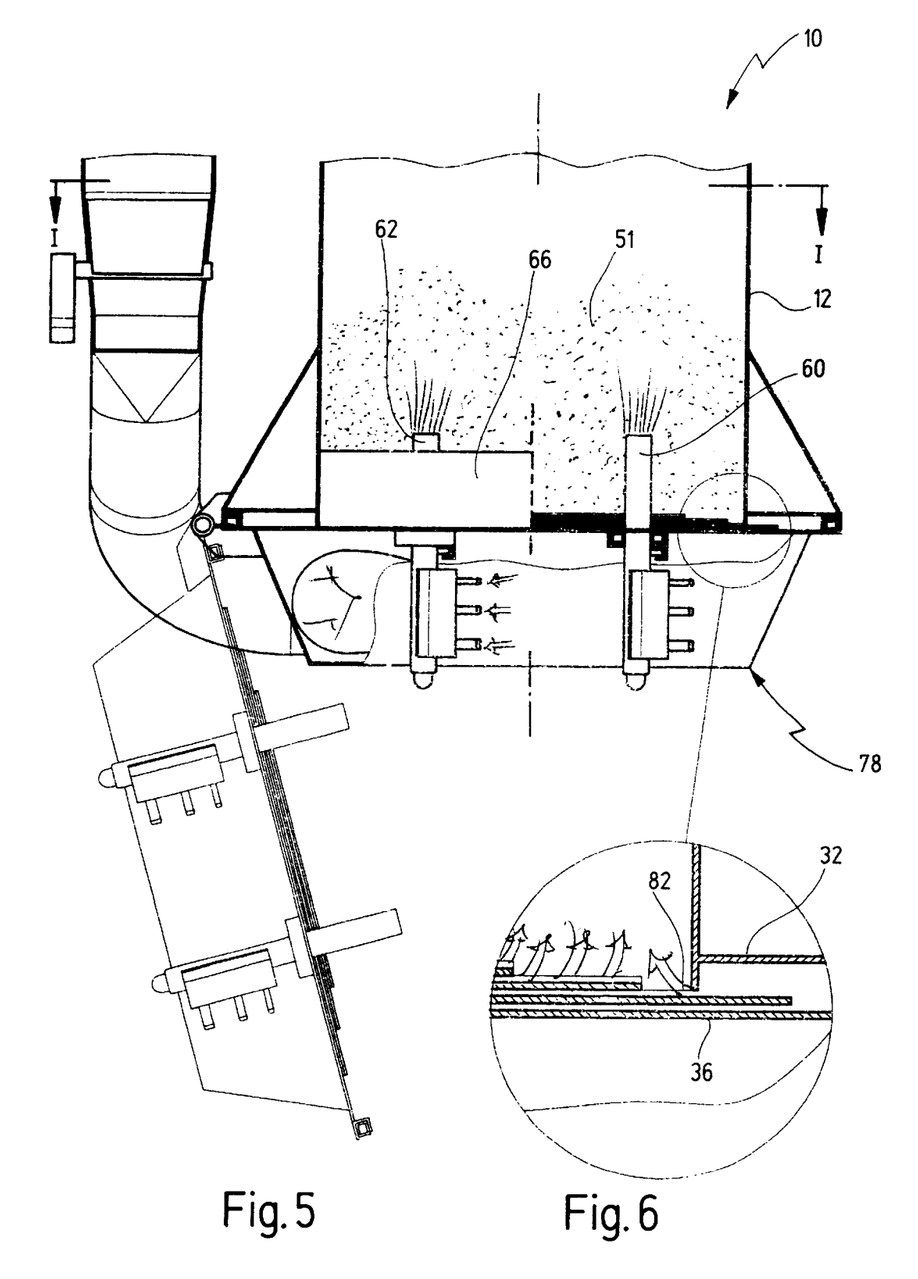
FIG. 5 shows a sectional view taken along line V—V in FIG. 1, showing additionally the nozzle assembly pivoted away in downward direction.
FIG. 6 shows a greatly enlarged representation of the area marked by a circle in FIG. 5.

As is apparent especially from the representation of FIGS. 1, 4 and 5 the process air removed from the tank 12 is guided through a central pipe 68 toward the bottom, then through a manifold 70 with a flap 72 to two separate lines 74 and 76 connected to the corresponding inflow chambers 46 and 48, respectively.

The particular design of the lower bottom 34 described above provides the possibility to arrange the nozzles on a common assembly 78 that can be pivoted away from the bottom, about the pivot axis 80, as shown in FIG. 5. From FIGS. 2 and 3 and 5 and 6, respectively, it appears that the baffle plates extend to a point below the circumferential annular flange 32 whereby semicircular circumferential slots 82 and 84, respectively, are formed.

This now makes it possible to inject the process air 42 directly into the corner transition area between the tank 12 and the bottom 14, and this in the proper direction of the flows 54 and 56, respectively.

Figure 7:
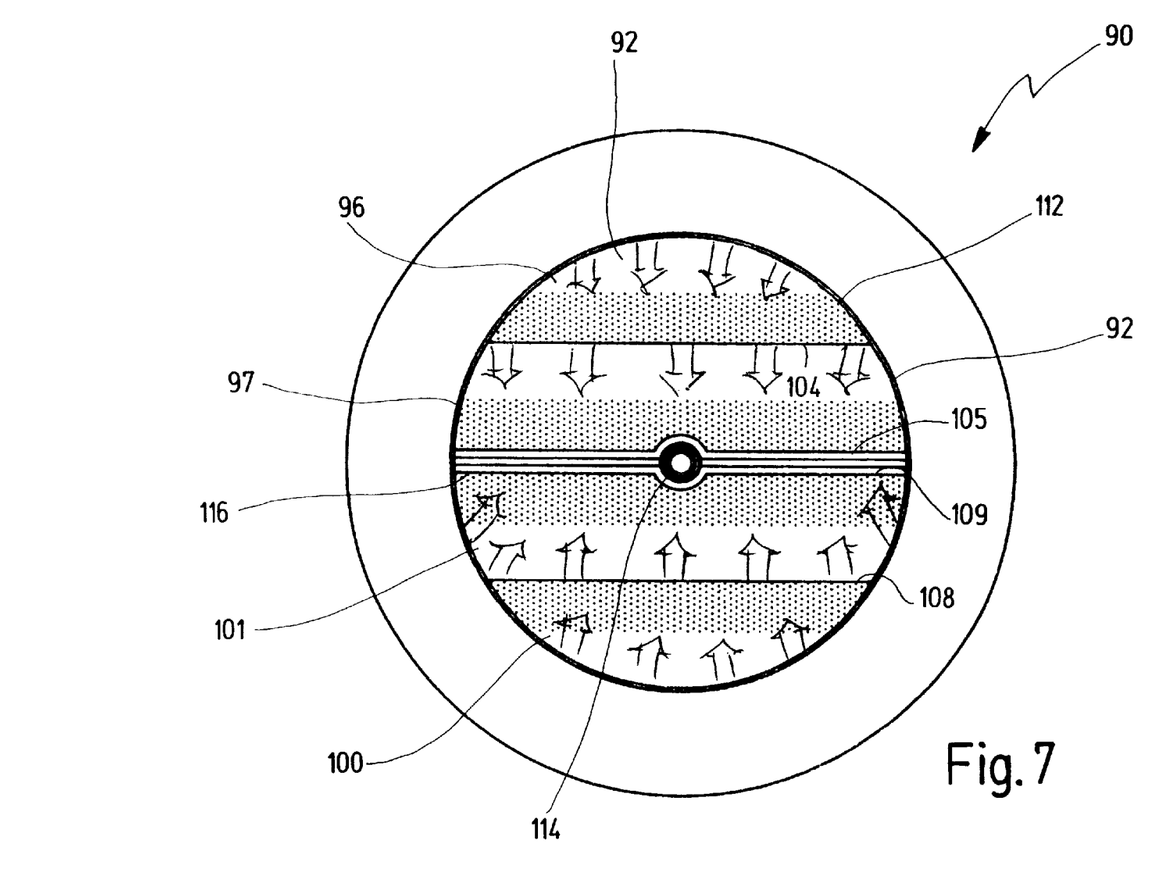
FIG. 7 shows a simplified top view, comparable to FIG. 1, of a bottom of a smaller device with the baffle plates perforated in part.

FIG. 7 shows a top view of a device 90, corresponding to the representation of FIG. 1, where the process air supply lines have been omitted.

The device 90 also comprises a hollow-cylindrical upright tank 92 closed by a bottom 94.

One side, or one half, of the bottom 94 is composed of two baffle plates 96 and 97, the baffle plate 97 being located below the baffle plate 96 and being overlapped a little by the latter, whereby a slot 104 is formed between the two elements. Diametrically opposite the described arrangement, two baffle plates 100 and 101 are provided with a slot 109 formed between them. As has been described before, two further slots 105 and 106, respectively, are then additionally provided directly at the breaking-up zone 116.

Here again, circumferential slots, not indicated in detail, are provided as indicated by flow arrows.

It is sufficient for this size of unit to provide a single nozzle 114 in the breaking-up zone 116.

A comparison between the top views of FIG. 1 and FIG. 7 shows that the spacing between the slots 104 and 107, or 108 and 109, viewed in the respective flow direction, is the same as the spacing between the slots illustrated in FIG. 1.

Consequently, identical flow conditions prevail in the respective slow directions.

This means that starting out from the basic size illustrated in FIG. 7, scaling-up to a bottom as illustrated in FIG. 1 is possible without any problem, by merely providing a correspondingly greater number of slots at the same spacings one relative to the other. The number of nozzles provided in the breaking-up zone is thus correspondingly increased as well; in FIG. 7 one nozzle is sufficient, in FIG. 1 two of them are required.

For the rest, the constructional design and the process air path are identical in the device 90 according to FIG. 1 to the device 10 described in connection with FIGS. 1 to 6.

FIG. 7 further shows that the second half of the baffle plates, viewed in the respective flow directions, is provided with perforations 112. The perforations 112 permit a certain, though small, quantity of process air to pass through the baffle plates from the bottom to the top and to impart to the product moving above the baffle plates a certain vertical component of motion. This is the case when especially coarse and heavy particulate product is moved and when there is a risk that the product may drop on to the surface of the baffle plate 101 by gravity, for example on its path between the slots 108 and 109.

The perforations 112 therefore act to produce an additional air cushion in approximately the second half of the path of movement, which serves to keep the product at the desired floating distance above the bottom.

What is claimed is:

1. A device for treating particulate product having
a process chamber for receiving and treating a particulate product, said process chamber having a circular bottom being constructed from baffle plates overlapping each other in a manner that slots are formed between said overlapping baffle plates through which slots process air can be introduced into said process chamber with a substantially horizontal component of motion, and means for creating two substantially horizontal flows of incoming process air opposing one another and for creating a breaking-up zone along a diameter of said circular bottom, said means comprising an arrangement of said overlapping baffle plates in that a first horizontal flow is created directed towards said breaking-up zone along said diameter and a second horizontal flow is created directed towards said breaking-up zone along said diameter, said second horizontal flow opposing said first horizontal flow, said two opposing flows meeting at said breaking-up zone along said diameter for forming an upwardly-directed substantially vertical flow.

2. The device of claim 1, wherein at least one nozzle pointing in a vertical upward direction is arranged in said breaking-up zone.

3. The device of claim 1, wherein guide surfaces are arranged in a section of said bottom having said breaking-up zone, said section defining a transition from said oppositely directed horizontal flows to said vertically upwardly directed flow.

4. The device of claim 1, wherein additional slots are arranged along a circumference of said bottom, through which additional slots process air can be introduced into said process chamber in line with each of said oppositely directed flows.

5. The device of claim 1, wherein said breaking-up zone extends approximately centrally across said bottom.

6. The device of claim 1, wherein said bottom is a circular bottom, said breaking-up zone extends along a diameter of said circular bottom, and said slots extend along secants of said circular bottom on both sides of said diameter.

7. The device of claim 1, wherein two inflow chambers are arranged beneath said bottom, said process air can be supplied into said two inflow chambers, each of said two inflow chambers supplies one of said two opposite flows.

8. The device of claim 7, wherein said two inflow chambers taper toward said breaking-up zone in a vertical direction thereby forming a slot that opens directly adjacent said breaking-up zone.

9. The device of claim 8, wherein at least one nozzle is arranged between said two inflow chambers, said nozzle being structurally separate from said two chambers.

10. The device of claim 9, wherein said at least one nozzle can be moved away from said bottom below of said bottom.

11. The device of claim 1, wherein said baffle plates are provided with perforations approximately in a second half before a next slot, viewed in a flow direction of each oppositely directed partial flow exiting a respective slot.

12. The device of claim 1, wherein distances between two following slots, viewed in a direction of flow, are equal in a series of several slots.

13. The device of claim 1, wherein said slots extend parallel one to another.

14. The device of claim 1, wherein all said slots have the same height.

* * * * *